United States Patent [19]

Grosu

[11] 4,181,868

[45] Jan. 1, 1980

[54] ALTERNATING CURRENT MOTOR

[75] Inventor: Stefan I. Grosu, Bucharest, Romania

[73] Assignee: Institutul de Cercetari Pentru Industria Electrotehnica - ICPE, Bucharest, Romania

[21] Appl. No.: 906,856

[22] Filed: May 17, 1978

Related U.S. Application Data

[63] Continuation of Ser. No. 775,402, Mar. 7, 1977, abandoned.

[30] Foreign Application Priority Data

Apr. 8, 1976 [RO] Romania .................................. 85466

[51] Int. Cl.² ............................................. H02K 1/06
[52] U.S. Cl. .................................... 310/166; 310/216; 310/218; 310/254
[58] Field of Search ............................... 310/216–218, 310/172, 185, 162–165, 254–259, 190–193, 42, 166

[56] References Cited

U.S. PATENT DOCUMENTS

| | | | |
|---|---|---|---|
| 2,464,320 | 3/1949 | Klinkhamer | 310/216 X |
| 2,774,000 | 12/1956 | Ross | 310/216 |
| 3,358,165 | 12/1967 | Grosu | 310/185 |
| 4,017,776 | 4/1977 | Fiegel | 310/172 |

Primary Examiner—Donovan F. Duggan
Attorney, Agent, or Firm—Karl F. Ross

[57] ABSTRACT

An alternating current electric machine, namely, a small-power asynchronous motor, has two pairs of electric poles which can be supplied with either three-phase or single-phase alternating current. The machine is considerably simpler than classic motors, being provided with a stator having single cylinder poles and four or six coils. The stator is made from grain-oriented steel sheet.

1 Claim, 4 Drawing Figures

ALTERNATING CURRENT MOTOR

This is a continuation of application Ser. No. 775,402 filed Mar. 7, 1977, now abandoned.

FIELD OF THE INVENTION

The invention relates to a rotating electric machine for alternating current, namely, a low-power three-phase or single-phase asynchronous motor.

BACKGROUND OF THE INVENTION

Rotating electric machines are known which have a stator armature of cylindrical form, provided with several radially disposed salient poles. In general there are provided at least two salient poles per phase and pair (p) of electric. Three-phase electric machines are also known which are provided with salient radially disposed poles, with one salient pole per phase and pair of electric poles. Thus there are machines with three salient poles (for p=1) and with six salient poles (for p=2). These machines have a relatively complicated design, give rise to difficulties with respect to the coil-mounting process and result in high consumption of electrical steel sheet.

There are also known three-phase a.c. motors provided with three salient poles with mutually parallel axes and a coil mounted on each of them. This arrangement results in simple design and in a material saving, but can be used only with speeds corresponding to a single pair of electric poles.

Also there are motors with three parallel salient poles and only two coils, one coil on each lateral pole. With these motors the speed also corresponds to one pair of electric poles.

SUMMARY OF THE INVENTION

The invention is an a.c. electric machine provided with a rectangular stator armature which has six poles and a central hole; the poles are divided into two groups of three poles each, one group at one side and the other one at the other side of the hole; the three poles of each group are united through one yoke which is generally perpendicular to the poles. One coil is mounted on each pole. The coils are connected to a three-phase supply so as to produce an equal number of pairs of electric poles and salient poles per phase. As a result, for example, the motor speed corresponds to the synchronous speed of n=60/2 f=1500 rev/min, for f=50 Hz.

The core is made of electrical steel sheets, and the yokes are assembled either by simple joining to the poles or by double lapping with the pole sheets. The steel sheets may be cut such that the rolling direction corresponds to the flux paths in most parts of the cores. Magnetic bridges, relatively thin, between the poles can be made, that are manufactured during the stamping process. The magnetic bridges improve the rotating field form and are arcuate ligatures continuing the periphery of the circular hole.

SPECIFIC DESCRIPTION

Figure 2B:
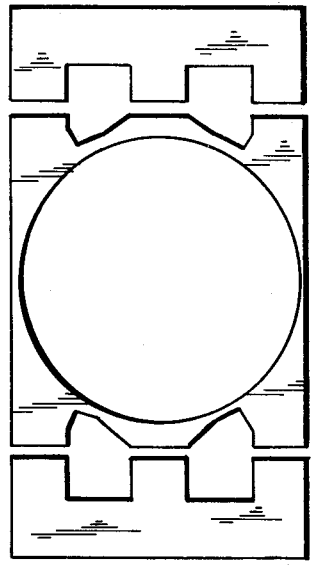
FIGS. 2A and 2B are diagrams of stator sheets.
Figure 1:
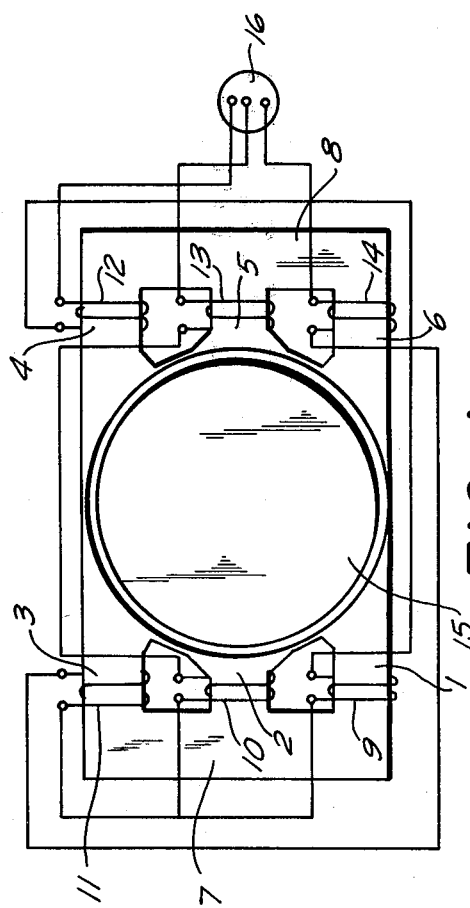
FIG. 1 is a diagram of a motor according to the invention.
Figure 2A:
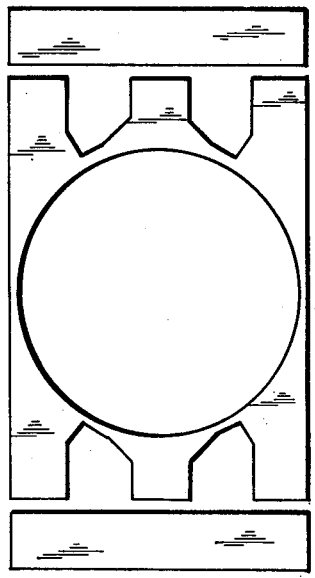

FIG. 1 shows the design of a motor conforming to the invention. The magnetic core has six poles 1,2,3,4,5,6, provided with yokes 7,8. The coils 9,10,11,12,13,14 are mounted on the poles. Within the stator armature hole there is a rotor 15, usually of squirrel-cage form. The mains supply link is the three-phase socket 16. The steel sheet shape is shown in FIG. 2A and/or FIG. 2B.

According to another variant of the invention, only four coils are used. The coils can be open-delta connected, between the three-phase lines, or between two lines and the neutral line, in case of three-phase supply, or they are connected in a well-known arrangement, with auxiliary impedance (generally with a capacitor) in the case of single phase supply.

Figure 3:
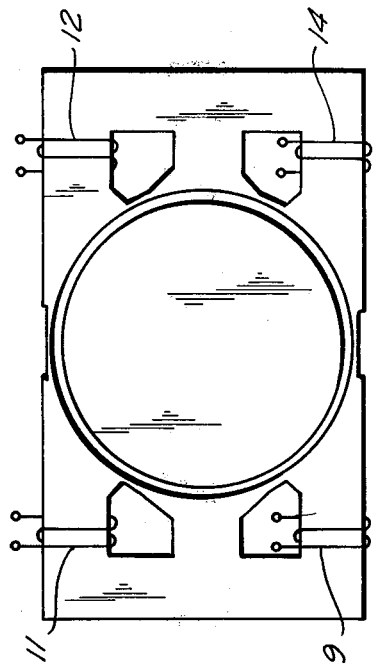
FIG. 3 is a diagram of another motor.

In FIG. 3 a motor is shown which has only four coils 9,11,12,14 on the four external poles.

The invention's advantage lies in that it makes it possible to make electric machines (mainly small power motors) with low material consumption, especially electrical steel. The core manufacture and mounting process is easy.

I claim:

1. An alternating current motor comprising a stator consisting of a stack of rectangular steel sheets and provided with a central circular bore, said stator having a rectangular shape in a plane perpendicular to the axis of said bore and being formed with two groups of three magnetic poles each in mutually parallel relationship, each of said poles extending from an arc of said bore toward a small side of the rectangle parallel to a long side thereof, respective yokes lying along each of the small sides of the rectangle and magnetically bridging the poles of the respective group, said arcs merging continuously with one another around the circumference of said bore, a respective coil on each of the poles with three pairs of coils being provided, each pair of coils having a common axis lying parallel to the respective poles, said groups of poles being disposed mirror symmetrically with respect to a plane perpendicular to said poles through the axis of said bore, a rotor rotatable in said bore, and means for connecting said coils to an alternating current supply source, said means for connecting said coils to said source including a three-phase connector having three terminals each connected to one side of respective coils on the poles of one of said groups, each of said coils on the poles of one of said groups being connected in series with the coil of a respective pair on an opposite pole of the other of said groups.

* * * * *